United States Patent
Buhrman

(10) Patent No.: US 7,082,713 B1
(45) Date of Patent: Aug. 1, 2006

(54) ROLLABLE MULCH CARPET

(76) Inventor: Gary Buhrman, 2518 Bopp Rd., St. Louis, MO (US) 63131

( * ) Notice: Subject to any disclaimer, the term of this patent is extended or adjusted under 35 U.S.C. 154(b) by 0 days.

(21) Appl. No.: 10/780,935

(22) Filed: Feb. 18, 2004

(51) Int. Cl.
*A01G 7/00* (2006.01)
*C09K 17/52* (2006.01)

(52) U.S. Cl. ............................ 47/9; 47/32; 47/21.1
(58) Field of Classification Search ............... 47/9, 47/32, 31.1; C09K 17/52
See application file for complete search history.

(56) References Cited

U.S. PATENT DOCUMENTS

| | | | |
|---|---|---|---|
| 1,949,068 A | * | 2/1934 | Achterhof ............... 428/356 |
| 3,067,542 A | * | 12/1962 | O'Brien ....................... 47/9 |
| 3,870,583 A | * | 3/1975 | Gidge ...................... 156/500 |
| 4,062,145 A | * | 12/1977 | Gidge ........................... 47/9 |
| 4,617,198 A | * | 10/1986 | Overturf ................... 427/186 |
| 4,794,726 A | * | 1/1989 | Fawcett et al. ............... 47/9 |
| 4,910,052 A | * | 3/1990 | Caldwell ................... 428/15 |
| 5,105,577 A | * | 4/1992 | Hedges ......................... 47/9 |
| 5,323,557 A | * | 6/1994 | Sonntag ...................... 47/32 |
| 5,330,804 A | * | 7/1994 | Allison et al. ............ 428/15 |
| 5,395,467 A | * | 3/1995 | Rogers, Jr. ................ 156/61 |
| 5,396,731 A | | 3/1995 | Byrne |
| 5,502,921 A | * | 4/1996 | Hyslop ....................... 47/32 |
| 5,910,514 A | * | 6/1999 | Greenberg et al. ....... 521/40.5 |
| 6,287,049 B1 | * | 9/2001 | Keinholz .................... 405/46 |
| 2004/0069924 A1 | * | 4/2004 | Lemieux et al. ........... 248/633 |
| 2004/0197146 A1 | * | 10/2004 | Zingg ........................ 404/35 |
| 2004/0200140 A1 | * | 10/2004 | Alexander ................. 47/32 |
| 2005/0229481 A1 | * | 10/2005 | Wilson ......................... 47/9 |

FOREIGN PATENT DOCUMENTS

| FR | 2768018 A1 | * | 3/1999 |
|---|---|---|---|
| JP | 06153688 A | * | 6/1994 |

OTHER PUBLICATIONS

English Transalation of French Patent FR 2768018, Mar. 1999, Chamoulaud, 14 pages.*
English Translation, Horticulture Mulching Mat, Method of Manufacturing Thereof, and Use Thereof in flower Beds, French Patent 2768018 to Michel Chamoulaud, 13 pages plus cover page.*

* cited by examiner

*Primary Examiner*—Andrea M. Valenti
(74) *Attorney, Agent, or Firm*—Polster, Lieder, Woodruff & Lucchesi, L.C.

(57) ABSTRACT

The present invention relates to a rollable artificial mulch carpet that includes a permeable base upon which simulated wood chips have been adhered. In one embodiment, the rollable mulch carpet is manufactured on rolls of varying lengths that are placed onto the soil surfaces of gardening areas to provide a mulch-like surface that allows penetration of moisture and atmosphere to the plants in the garden and a mulch-like appearance that resists deterioration.

14 Claims, 1 Drawing Sheet

ROLLABLE MULCH CARPET

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to artificial mulch, and, in particular, to a rollable artificial mulch carpet that can be cut to desired size and shape.

Garden areas contain plants and flowers that a gardener likes and wishes to display. A great deal of effort is expended in taking care of the plants that have been located within a garden area. These efforts include ensuring the plants obtain the appropriate amounts of water and atmosphere needed to allow the plants to flourish. In providing this favorable environment for desirable plants, however, other non-desirable plants take advantage of these same favorable conditions. As a result, both desirable and undesirable plants can be found in many garden areas.

One solution to eliminating these unwanted plants, otherwise known as weeds, is to trim these plants using one of the various weed cutting tools available to gardeners such as string trimmers and hand clippers. However, while this may cut down the weeds currently within the garden, the roots for the weeds remain and the weeds usually grow back within a few days or weeks. To eliminate the weeds, some gardeners try to pull the entire weed, root and all, from the garden soil. This is a very tedious effort and is usually met with only moderate success because the roots of some weeds go deeply into the ground. Other methods such as herbicides are also used, however, use of such herbicides always presents the danger that the herbicide may be just a lethal to the desirable plants as to the undesirable plants.

While there are other solutions to eliminating undesirable plants while providing moisture and atmosphere to the desirable plants, perhaps the most commonly used solution is the application of various types of mulch within gardens. The normal mulching process includes the generation of mulch by shredding or chipping various types of wood and/or barks. This mulch is then placed on those areas of the garden that the gardener wishes to protect from the imbedding and growth of undesirable plants. Because the mulch is generally porous, water filters through the mulch and enters the ground to allow the desirable plants to obtain the moisture those plants need to live and flourish. Additionally, this same porosity allows the atmosphere to come into contact with the garden soil thereby allowing other important nutrients to enter the garden soil. The coverage provided by the mulch prevents sunlight from reaching the garden soil to prevent the growth of undesirable plants. The mulch also prevents unwanted plant growth by applying pressure to any weed sprouts that may attempt to push through the mulch.

Although mulch provides a good way to control the growth of weeds, mulch does have some undesirable characteristics. First, mulch can be very expensive to apply to a garden area. Generally, the better grades of mulch are the best protection against weeds and also provide the best overall garden appearance. However, the better grades of mulch are also expensive. Second, due to the biodegradable nature of wood mulch, the mulch often needs to be maintained and even replenished periodically. The mulch can also be subject to weather conditions that may blow or erode the mulch from the garden area. Any delay in replenishing degraded mulch quickly results in the entrance of weed seeds within a garden and the subsequent proliferation of weeds throughout the garden area. Finally, if the wrong mulch is used, or if the wrong amount of mulch is applied to a garden area, water and air may actually be completely prohibited from enter the garden soil resulting in damage to the desirable plants within the garden area. Natural wood mulch is also very attractive to insects—especially termites. Finally, because the mulch is made from tree fiber, use of such material can contribute to the overuse of tree and tree byproducts.

As can be seen, the use of standard mulch made from biodegradable tree and tree byproducts has a number of disadvantages.

SUMMARY OF THE INVENTION

The present invention overcomes these and other problems by providing a rollable mulch carpet having generally non degradable mulch-like material attached to a base material.

The present invention also offers a number of other substantial advantages. The rollable mulch carpet can be easily installed by anyone and can be customized to fit any garden shape by cutting the rollable carpet with standard scissors. There are no chemicals to mix to apply the mulch carpet to the garden area. Instead, the mulch carpet is unrolled to cover the garden surface to be protected. In contrast to the application of standard wood mulch that requires lifting and emptying heavy bags of mulch, the present invention is simply placed at a desired location and rolled out over the garden area to be protected. And, once installed into one garden area, the present invention can be easily moved to a different garden area if the gardener chooses to relocate the garden.

Maintenance of the present invention is also simple. If the rollable mulch carpet becomes dirty or dusty it can be cleaned by rinsing the carpet off with a garden hose or a power washer. Or, in the instance where a smaller portion of carpet is used, the entire carpet can be lifted from the garden bed and shaken to release dust and dirt. Also, because of the type of material used to make the rollable mulch carpet, the present invention does not attract the insects and termites normally attracted to natural wood mulch.

Additional features of the present invention will be in part apparent and in part pointed out hereinafter.

BRIEF DESCRIPTION OF THE SEVERAL VIEWS OF THE DRAWINGS

Corresponding reference characters indicate corresponding parts throughout the several views of the drawings.

While one embodiment of the present invention is illustrated in the above referenced drawings and in the following description, it is understood that the embodiment shown is merely for purpose of illustration and that various changes in construction may be resorted to in the course of manufacture in order that the invention may be utilized to the best advantage according to circumstances which may arise, without in any way departing from the spirit and intention of the invention, which is to be limited only in accordance with the claims contained herein.

DETAILED DESCRIPTION OF THE INVENTION

Figure 1:
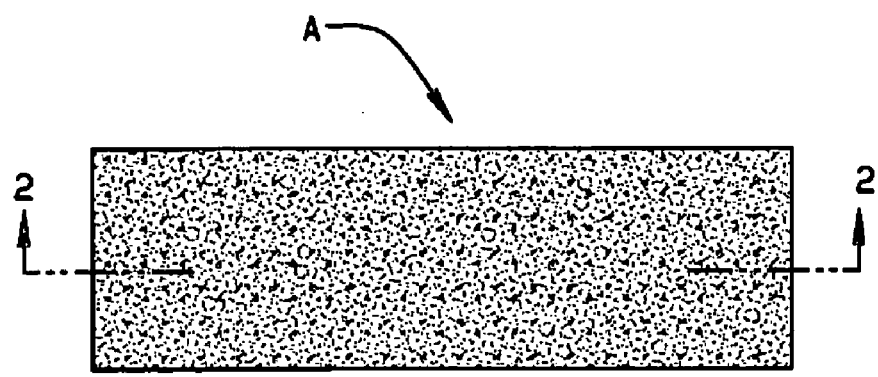
FIG. 1 is a plan view of one embodiment of the present invention.
Figure 2:
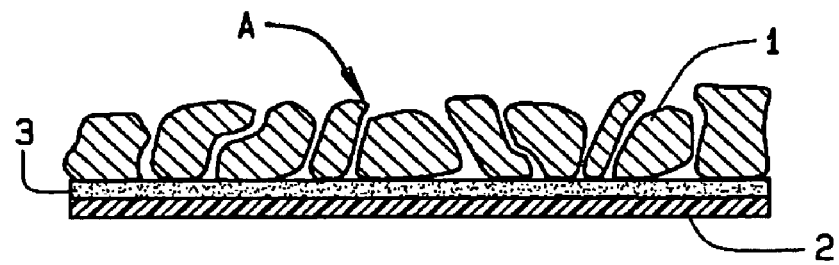
FIG. 2 is a vertical section view of one embodiment of the present invention.

Referring now to FIG. 1, a rollable artificial much carpet A is shown. The rollable mulch carpet A includes an artificial mulch-like material 1 attached to a base material 2 (FIG. 2). In the present embodiment of the present invention, the mulch-like material 1 is made from recycled tires (such as automobile tires) that have been shredded and colored to give the appearance of being natural wood mulch. As is known, the tires can be shredded and colored to have the appearance of cedar mulch which is thin and relatively fine, or oak or redwood much, which is thicker and coarser. The manner of shredding and coloring is well-known and does not form a part of the present invention. It will be appreciated that rubber or plastic materials other than recycled tires may also be used as long as the material provides the appearance of natural wood mulch, is bondable or attachable to the base material 2, and is resistant to deterioration due to weathering. Plastic or rubber material are two examples of alternative raw material from which the mulch-like material 1 may be made.

In the current embodiment, the mulch-like material 1 is adhered to an upper surface of the base material 2. The base material 2 is a rubber or plastic mesh material, but can be made of virtually any type of material that resists degradation in normal weather environments as long as the material used is strong enough to be handled without breaking or tearing after the mulch-like material 1 has been adhered to the base material 2. Additionally, the material selected for use as the base material 2 must be sufficiently porous enough to allow water and moisture to seep through the material and into the garden soil, and the material must be capable of bonding to the adhesive 3 used to mount the mulch-like material to the base material 2. The mulch-like material 1 can be adhered to the base material 2 using any conventional technique. Preferably, the mulch-like material 1 is bonded to the base material 2 using a chemical or heat. Heat bonding can be done via ultra-sonic welding or by heating the mulch and base layer in an oven. Chemical bonding can be done using solvents which will cause the mulch layer to bond to the base material. To enhance the bonding (especially if accomplished via chemical or heat), the base material 2 and the mulch-like material 1 are made from the same type of plastic or rubber. Alternatively, the mulch-like material 1 can be adhered to the base material 2 using any well-known adhesive. If an alternative embodiment is elected wherein the mulch-like material 1 is attached mechanically to the base material 2, the material selected must be strong enough to sufficiently retain the mulch-like material 1 onto the base material 2. The base material 2 should also be flexible enough to allow for the proper installation of the rollable mulch carpet A onto various types of garden terrains. In the present embodiment, the base material 2 consists of a woven rubber or plastic mesh. As described, the mulch material 1 is adhered to the base material 2 only along a lower portion of the mulch material, leaving an upper portion of the mulch material exposed.

The mulch-like material 1 is adhered to the base material 2 such that there is a single layer of the mulch-like material 1 that substantially covers the base material 2. This prevents the rollable mulch carpet A from getting too thick or too heavy. Preferably, the rollable mulch carpet A has a thickness of an 1" or less, and preferably about ½" or even ¼" or less. The small thickness allows for easy cutting of the rollable mulch carpet A with standard scissors. The thickness of the carpet will depend on the type of "mulch" the material 1 is to be. Thus, a cedar mulch carpet would be thinner than an oak or redwood mulch carpet.

Figure 3:
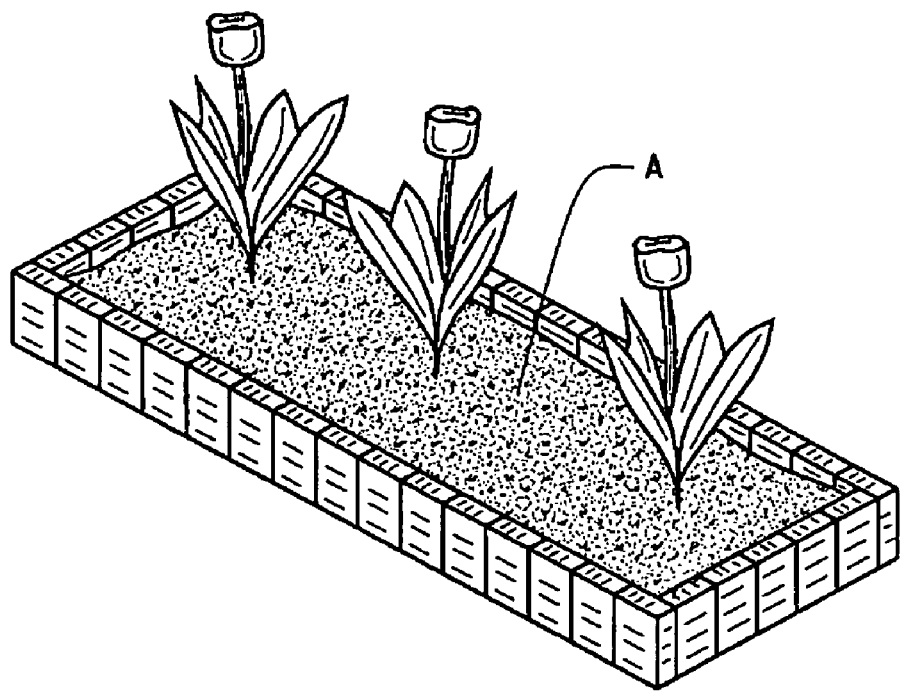
FIG. 3 is a perspective view showing a common installation of one embodiment of the present invention.

The present embodiment of the invention requires the rollable mulch carpet A to be manufactured in rectangular strips, preferably, about 3 feet in width by about 10 feet in length. This produces a rollable mulch carpet A that can be handled relatively easily. The mulch carpet could be formed in other dimensions and shapes if desired. Installation of the present embodiment includes placing the rollable mulch carpet A on a generally flat surface and trimming the rollable mulch carpet A to fit the dimensions of the garden area into which the rollable mulch carpet A is to be placed. Trimming can be accomplished using standard scissors. After trimming is complete, the rollable mulch carpet A is placed on the garden surface with the lower surface of the base material adjacent the ground or garden surface. The mulch carpet A is then unrolled until the rollable mulch carpet A covers the desired area of the garden. If required, holes may be cut into the rollable mulch carpet A to accommodate current or future desirable plants that are in the garden. FIG. 3 shows one embodiment of the present invention after installation into a garden area having border elements. If it is desired to cover a section larger than the area of the carpet, a second section of the carpet can be positioned in abutting or overlapping relationship with a first section to cover such larger areas.

While the above description describes various embodiments of the present invention, it will be clear that the present invention may be otherwise easily adapted to fit any configuration where a rollable mulch carpet may be utilized. The mulch carpet A can be used, for example, on flat ground, or on sloped ground, even if the slope is a steep slope. Because the mulch material 1 is adhered or bonded to the base material 2, the mulch carpet can be washed with a hose or a pressure sprayer without loss of the mulch material from the base material.

As various changes could be made in the above constructions without departing from the scope of the invention, it is intended that all matter contained in the above description or shown in the accompanying drawings shall be interpreted as illustrative and not in a limiting sense.

What is claimed is:

1. A rollable mulch carpet consisting of:
  a base material made from a non-biodegradable, generally flexible and porous rubber material, the base material having a lower ground engaging surface and an upper surface; and
  an artificial mulch-like material having the general appearance of natural wood mulch, the artificial mulch-like material being made from shredded rubber tires and being bonded to the upper surface of the base material only along a lower portion of the artificial mulch-like material such that an upper portion of the artificial mulch-like material is exposed; said artificial mulch-like material substantially covering the upper surface of the base material; said mulch-like material being bonded to the upper surface of the base material by chemical or heat without the use of adhesive.

2. The rollable mulch carpet of claim 1 wherein the mulch-like material and the base material are made substantially from the same rubber.

3. The rollable mulch carpet of claim 1 wherein the rollable mulch carpet is flexible enough to be stored, transported, or installed in a rolled up configuration.

4. The rollable mulch carpet of claim 3 wherein the mulch-like material is generally weather resistant.

5. The rollable mulch carpet of claim 4 wherein the rollable mulch carpet is manufactured in generally rectangular sections of about 3 feet in width and about 10 feet in length.

6. The rollable mulch carpet of claim 5 wherein the base material includes a plurality of openings of not greater than about 0.0625 square inches.

7. The rollable mulch carpet of claim 6 wherein the base material and the mulch-like material are resistant to damage by insects.

8. The rollable mulch carpet of claim 1 wherein the mulch-like material is adhered to the base material in a single layer that substantially covers the upper surface of the base material.

9. The rollable mulch carpet of claim 8 wherein the single layer of mulch-like material has a thickness of about 0.5 inch or less.

10. A process of manufacturing a rollable mulch carpet consisting of the steps of:

providing a rubber base material that is generally flexible and substantially porous and having an upper surface;

providing a mulch-like material from a weather resistant material made from shredded rubber tires having the appearance of natural wood mulch; and bonding the mulch-like material to the upper surface of the base material only along a lower portion of the mulch-like material such that an upper portion of the mulch-like material is exposed; said mulch-like material being bonded to said base material in a single layer and without the use of adhesive.

11. The process of claim 10 further comprising the step of manufacturing the rollable mulch carpet in generally rectangular sections.

12. The process of claim 11 further comprising the step of manufacturing the rollable carpet mulch in a generally rectangular section having a width of about 3 feet and a length of about 10 feet.

13. The process of claim 10 wherein the step of bonding the mulch-like material to the base material is performed either by the application of heat or by chemically bonding the mulch material to the base material.

14. The process of claim 10 wherein the rollable mulch carpet has a thickness of about 0.5 inch or less.

* * * * *